United States Patent
Ra

(10) Patent No.: US 7,030,778 B2
(45) Date of Patent: Apr. 18, 2006

(54) SWITCHING DEVICE FOR RIGHT AND LEFT IMAGE INVERSION IN REAR MONITORING CAMERA OF AUTOMOBILE

(75) Inventor: Youn Hwan Ra, Seoul (KR)

(73) Assignee: Eastern Mastec Corporation, Kyunggido (KR)

(*) Notice: Subject to any disclaimer, the term of this patent is extended or adjusted under 35 U.S.C. 154(b) by 681 days.

(21) Appl. No.: 10/216,840

(22) Filed: Aug. 13, 2002

(65) Prior Publication Data

US 2003/0169336 A1 Sep. 11, 2003

(30) Foreign Application Priority Data

Mar. 11, 2002 (KR) .............................. 2002-7161 U

(51) Int. Cl.
  *G08G 1/017* (2006.01)
  *G08G 1/054* (2006.01)
(52) U.S. Cl. .................................. 340/937; 348/148
(58) Field of Classification Search ................ 340/937, 340/425.5, 435, 436, 903; 348/148, 149, 348/151
See application file for complete search history.

(56) References Cited

U.S. PATENT DOCUMENTS

| | | | |
|---|---|---|---|
| 5,680,123 A | 10/1997 | Lee | |
| 5,706,362 A | 1/1998 | Yabe | |
| 5,760,848 A | 6/1998 | Cho | |
| 5,879,289 A | 3/1999 | Yarush et al. | |
| 5,978,017 A * | 11/1999 | Tino | 348/148 |
| 6,218,960 B1 * | 4/2001 | Ishikawa et al. | 340/901 |
| 6,509,832 B1 * | 1/2003 | Bauer et al. | 340/425.5 |
| 6,744,380 B1 * | 6/2004 | Imanishi et al. | 340/937 |
| 6,812,831 B1 * | 11/2004 | Ikeda | 340/435 |
| 6,819,231 B1 * | 11/2004 | Berberich et al. | 340/435 |
| 6,859,148 B1 * | 2/2005 | Miller et al. | 340/937 |
| 6,912,001 B1 * | 6/2005 | Okamoto et al. | 348/222.1 |

* cited by examiner

*Primary Examiner*—John Tweel, Jr.
(74) *Attorney, Agent, or Firm*—Mayer, Brown, Rowe & Maw LLP

(57) ABSTRACT

A switching device for left/right image inversion in a rear monitoring camera of automobile, which can ensure simplicity in assembling the camera and improve reliability of on/off operation by mounting a magnet sensor inside a body of the rear monitoring camera and attaching a magnet to the outside of the body. The switching device for left/right image inversion includes the magnet for generating a magnetic force, a pair of magnet insertion holes formed at a rear side of a casing connected to a printed circuit board mounted inside camera in such a manner as to be spaced apart from each other by a predetermined distance such that the magnet is inserted thereinto, and adapted to form a normal image and a mirror image, respectively.

4 Claims, 3 Drawing Sheets

SWITCHING DEVICE FOR RIGHT AND LEFT IMAGE INVERSION IN REAR MONITORING CAMERA OF AUTOMOBILE

BACKGROUND OF THE INVENTION

1. Field of the Invention

The present invention relates to a rear monitoring camera of an automobile, and more particularly, to a switching device for left/right image inversion in a rear monitoring camera of the automobile, which can ensure simplicity in assembling the camera and improve reliability of on/off operation without damage on apparatuses even after long-term use thereof by mounting a magnet sensor inside a body of the rear monitoring camera and attaching a magnet having a magnetic force to the outside of the body.

2. Background of the Related Art

In general, an automobile is provided with a rear-view mirror and left/right side mirrors, such that a user visually recognizes the condition of the rear side through the rear-view mirror during backing or parking. Since there are blind spots when the user visually recognizes the condition of the rear side of the automobile through the rear-view mirror, however, there exists a possibility of collision during the parking or backing.

To solve the possibility of collision during the backing of the automobile, a monitoring camera is installed on a trunk of the automobile, thereby broadening the field of vision of the rear side of the automobile.

The monitoring camera largely includes a photographing section for photographing surrounding objects or background, an image reproducing section for reproducing an image photographed by the photographing section to output the same, and a monitor section for displaying the image reproduced and output by the image reproducing section. The monitoring camera configured as above is installed in such places as banks, public offices, and places requiring security so as to monitor surroundings.

FIG. 1 is a perspective view of a conventional rear monitoring camera of automobile having a switching device for image left/right inversion embedded therein.

Referring to FIG. 1, the rear monitoring camera 10 having the switching device for left/right image inversion embedded therein includes a body 12 for protecting various components inside the camera, a photographing section 14 installed at the front of the body 12 and adapted to photograph surrounding objects or background, a printed circuit board (not shown) installed inside the body 12 and adapted to electrically connect the various components to each other, and a push-type on/off switch 18 installed at a lower portion of a casing 15 connected to the printed circuit board and adapted to be electrically connected to the printed circuit board in such a manner that when a button 16 disposed on the outside of the camera 10 is pushed by a hand, the button is mechanically operated.

The operation of the rear monitoring camera of an automobile configured as above will be explained as follows.

First, when a driver puts the automobile in gear to back or turns on a monitor (not shown), the photographing section 14 of the rear monitoring camera 10 installed on the trunk of the automobile photographs surrounding objects or background in the rear side of the automobile, and transfers the photographed image to the image reproducing section (not shown).

Then, the image reproducing section reproduces the photographed image and transfers the reproduced image to the monitor.

At this time, the image displayed on the monitor is selected from a normal image and a mirror image according to the driver's demand. The mirror image denotes an inverted image of the normal image such that left and right thereof seem to be reversed.

Here, the normal image output on the monitor makes the driver feeling that he/she actually observes the rear side, whereas the mirror image output on the monitor makes the driver feeling that he/she views a rearview mirror of the automobile.

That is to say, if the driver pushes the button of the push-type on/off switch 18 for left/right image inversion and closely contacts the push-type on/off switch with the printed circuit board, a controller (not shown) which receives an electrical signal of the printed circuit board sends a control signal indicating that a normal image is output to the monitor.

On the contrary, if the driver pushes the button of the push-type on/off switch 18 for left/right image inversion again, the button of the push-type on/off switch 18 closely contacted with the printed circuit board is separated from the printed circuit board. At that point, the controller sends a control signal indicating that a mirror image is output to the monitor.

However, the conventional rear monitoring camera of automobile requires a switch body and a spring in order to turn on the button of the push-type on/off switch for left/right image inversion, a rubber for waterproofing, and screws for fixing, and so on, resulting in increase of manufacturing costs.

In particular, when the rear monitoring camera of an automobile is assembled, the push-type on/off switch for left/right image inversion mounted on the inside and outside of the camera casing as well as on the printed circuit board should exactly correspond in position to the rubber for waterproofing. Otherwise, wrong operation would occur. In consequence, the conventional art has a problem of inconvenience in assembling the camera. The conventional art has another problem of deterioration in reliability of the on/off operation of the button due to damage on the apparatuses after the switch is mechanically used for a long time. The conventional art has still another problem of failure in perfect waterproofing which is one of the most important points for the rear monitoring camera.

SUMMARY OF THE INVENTION

Accordingly, the present invention is directed to a switching device for left/right image inversion in a rear monitoring camera of automobile that substantially obviates one or more problems due to limitations and disadvantages of the related art.

An object of the present invention is to provide a switching device for left/right image inversion in a rear monitoring camera of automobile, which can ensure simplicity in assembling the camera and improve reliability of on/off operation without damage on apparatuses even after long-term use thereof by mounting a magnet sensor inside a body of the rear monitoring camera and attaching a magnet having a magnetic force to the outside of the body.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided the present invention. According to the present invention, in a rear monitoring camera of automobile including a controller for controlling the overall operation of the system, a body for protecting various components inside the camera, a photographing section installed at the front of the body and adapted to photograph surrounding objects or background, a printed circuit board mounted inside the body and adapted to electrically connect the various components to each other, and a switching device for left/right image inversion electrically connected to the printed circuit board and adapted to select either a normal image or a mirror image displayed on a monitor, the switching device for left/right image inversion comprises: a magnet for generating a magnetic force; a pair of magnet insertion holes formed at a rear side of a casing connected to the printed circuit board inside the body of the camera in such a manner as to be spaced apart from each other by a predetermined distance such that a magnet is inserted thereinto, and adapted to form a normal image and a mirror image, respectively; a magnet sensor for turning on a switch embedded therein by means of a magnetic field generated in the magnet when the magnet is inserted into the magnet insertion hole for normal image; a power supplying section for supplying an electric power to the magnet sensor; a signal stabilizing circuit for stabilizing the electric power applied from the power supplying section when the switch embedded the magnet sensor is turned on so as to generate a normal image control signal; and a timing section for providing the normal image control signal generated from the signal stabilizing circuit to the controller to display a normal image on the monitor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
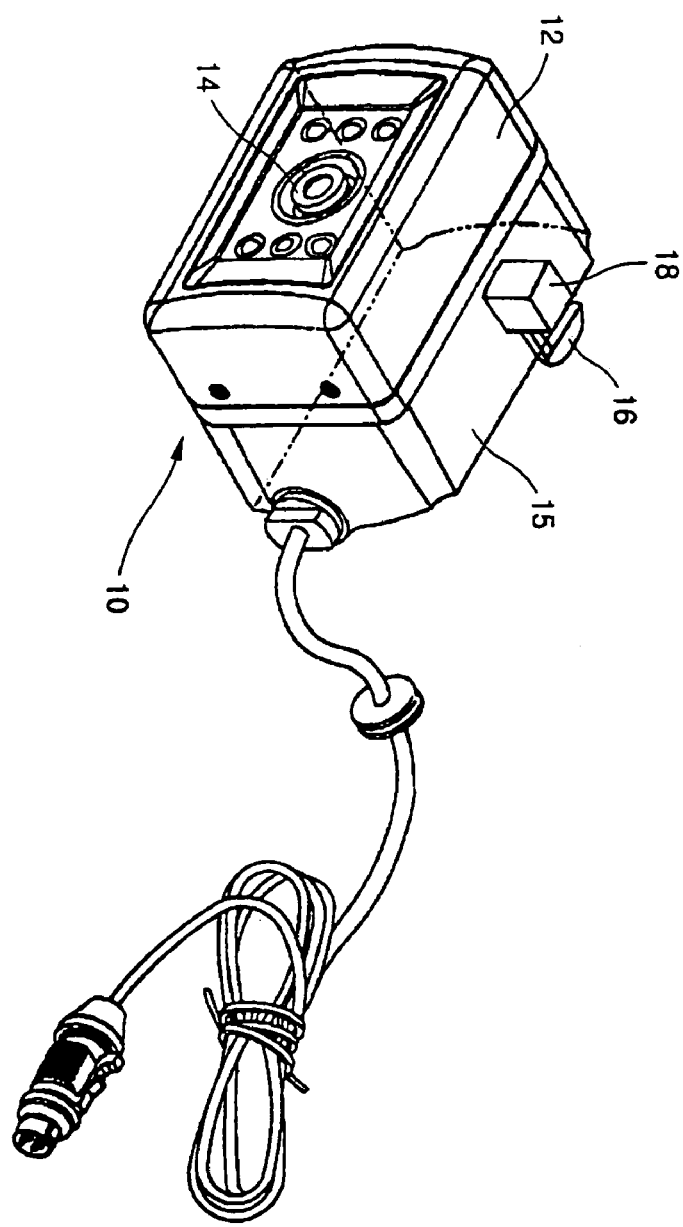
FIG. 1 is a perspective view of a conventional rear monitoring camera of automobile having a switching device for left/right image inversion embedded therein.
Figure 2:
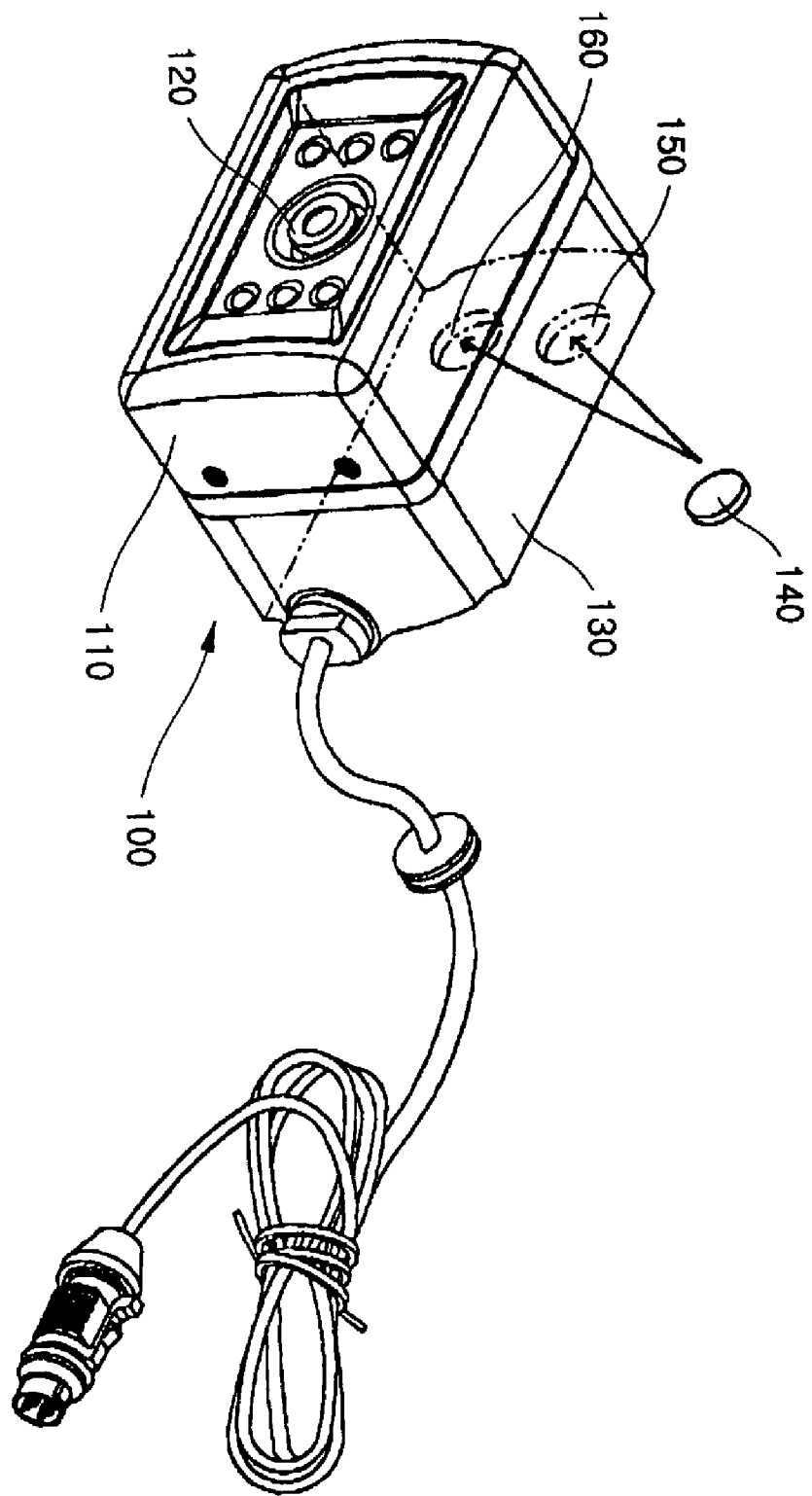
FIG. 2 is a perspective view of a rear monitoring camera of automobile having a switching device for left/right image inversion embedded therein according to the present invention.

FIG. 2 is a perspective view of a rear monitoring camera of automobile having a switching device for left/right image inversion embedded therein according to the present invention.

Referring to FIG. 2, the monitoring camera 100 of automobile having the switching device for left/right image inversion embedded therein includes a body 110 for protecting various components therein, a photographing section 120 installed at the front of the body and adapted to photograph surrounding objects or background, a printed circuit board (not shown) installed inside the body 110 and adapted to electrically connect the various components to each other, and the switching device (not shown) for left/right image inversion electrically connected to the printed circuit board and adapted to output either a normal image or a mirror image to a monitor (not shown).

Figure 3:
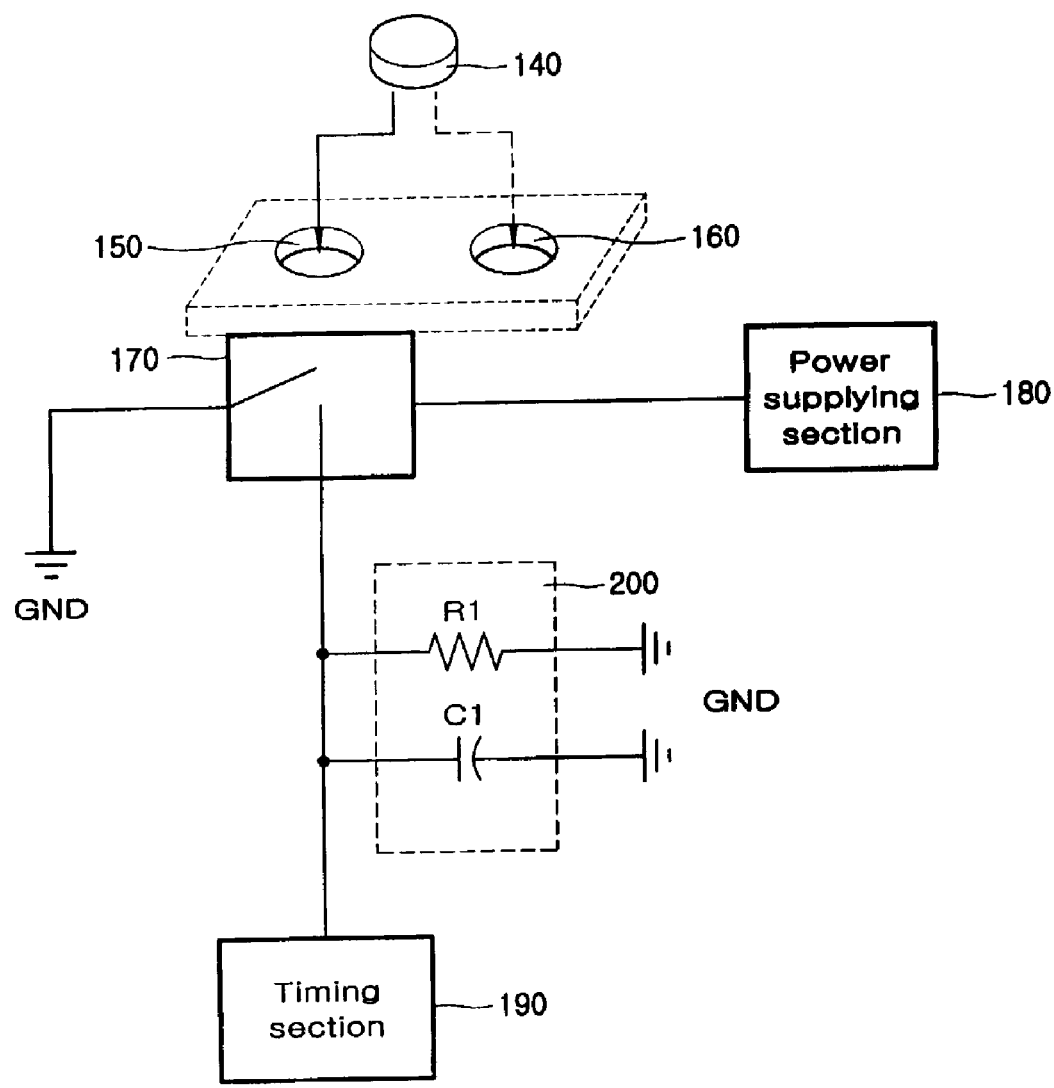
FIG. 3 shows the configuration of the switching device for left/right image inversion in the rear monitoring camera of automobile according to the present invention.

FIG. 3 shows the configuration of the switching device for left/right image inversion in the rear monitoring camera of automobile according to the present invention.

The switching device for left/right image inversion, as illustrated in FIG. 2, includes a pair of magnet insertion holes 150 and 160 installed on a rear side of a casing 130 connected to the printed circuit board mounted inside the body 110 of the camera in such a manner as to be spaced apart from each other by a predetermined distance such that a magnet 140 is inserted thereinto, and adapted to form a normal image and a mirror image, respectively, a magnet sensor 170 for turning on a switch embedded therein by a magnetic force generated when the magnet 140 is inserted into the magnet insertion hole for normal image 150, a power supplying section 180 for supplying an electric power to the magnet sensor 170, a signal stabilizing circuit 200 connected to the magnet sensor 170 and having a resistor R1 and a capacitor C1 which stabilize the electric power applied from the power supplying section 180 when the switch embedded in the magnet sensor 170 is turned on so as to generate a normal image control signal, and a timing section 190 for providing the normal image control signal generated from the signal stabilizing circuit 200 to a controller (not shown) to display a normal image on the monitor.

Here, the magnet insertion hole 150 for normal image serves as a place where the magnet sensor 170 can sense the magnet 140, and the magnet insertion hole 160 for mirror image serves as a place for receiving the magnet 140 to prevent the loss of the magnet 140.

The magnet insertion hole 160 for mirror image is positioned beyond a range in which the magnet sensor 170 can sense.

The operation of the switching device for left/right image inversion in the rear monitoring camera of automobile will be explained herein below.

When a driver wants to see a normal image through the monitor, first, he/she inserts the magnet 140 into the magnet insertion hole 150 for normal image.

Then, in the magnet sensor 170, the switch is turned on by means of the magnetic field generated in the magnet 140 when the magnet is inserted into the magnet insertion hole 150 for normal image.

At this time, the power supplying section 180 supplies electric power to the magnet sensor 170, and the magnet sensor 170 outputs the electric power output from the power supplying section 180 through the switch which is turned on to the signal stabilizing circuit 200.

The signal stabilizing circuit 200 stabilizes a voltage, which is output from the magnet sensor 170, into a High state via the resistor R1 and the capacitor C1 and transfers a normal image control signal to the timing section 190.

The timing section 190 transfers the normal image control signal output from the signal stabilizing circuit 200 to the controller, so as to display a normal image on the monitor.

Meantime, when the driver wants to see a mirror image, he/she inserts the magnet 140 into the magnet insertion hole 160 for mirror image.

Then, the magnet sensor 170 becomes unaffected by the magnetic field generated in the magnet 140, thereby turning off the switch embedded therein.

Accordingly, the electric power supplied from the power supplying section 180 is not transferred to the signal stabilizing circuit 200, and thus, the normal image control signal(High) is not transferred to the timing section 190 as well.

In this case, the normal image control signal output to the controller from the timing section 190 is cut off, and the controller controls a mirror image, which is a inverted image of the normal image, to be displayed on the monitor.

As described above, the present invention has an advantage of reducing manufacturing costs since a switch body, a spring, rubber for waterproofing, and so on, which the conventional art requires, are not needed.

The present invention has a further advantage of improving efficiency in assembling the camera, and improving reliability of the on/off operation since the shifting device for left/right image inversion using the magnet is employed and accordingly there is no damage on the apparatuses even after long-term use thereof.

The present invention has another advantage of basically solving the difficulty of waterproofing which is the hardest problem in the conventional art.

The present invention has still another advantage of being applicable to a monitoring camera for outdoor use, viz., for monitoring households, offices, warehouses, etc.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. In a rear monitoring camera of automobile including a controller for controlling the overall operation of a system, a body for protecting various components inside the camera, a photographing section installed at the front of the body and adapted to photograph surrounding objects or background, a printed circuit board mounted inside the body and adapted to electrically connect the various components to each other, and a switching device for left/right image inversion electrically connected to the printed circuit board and adapted to select either a normal image or a mirror image displayed on a monitor, the switching device for left/right image inversion comprising:

a magnet for generating a magnetic force;
   a pair of magnet insertion holes formed at a rear side of a casing connected to the printed circuit board mounted inside the body of the camera in such a manner as to be spaced apart from each other by a predetermined distance such that the magnet is inserted thereinto, and adapted to form a normal image and a mirror image, respectively;
   a magnet sensor for turning on a switch embedded therein by means of a magnetic field generated in the magnet when the magnet is inserted into the magnet insertion hole for normal image;
   a power supplying section for supplying an electric power to the magnet sensor;
   a signal stabilizing circuit for stabilizing the electric power applied from the power supplying section when the switch embedded inside the magnet sensor is turned on so as to generate a normal image control signal (High); and
   a timing section for providing the normal image control signal(High) generated from the signal stabilizing circuit to the controller to display a normal image on the monitor.

2. The switching device as claimed in claim 1, wherein the magnet sensor turns off the switch embedded therein when the magnet is inserted into the magnet insertion hole for mirror image.

3. The switching device as claimed in claim 1, wherein the magnet insertion hole for mirror image serves as a place for receiving the magnet to prevent the loss of the magnet.

4. The switching device as claimed in claim 1, wherein the signal stabilizing circuit includes a resistor and a capacitor which filter and stabilize the electric power applied from the power supplying section when the switch embedded in the magnet sensor is turned on.

* * * * *